No. 682,585. Patented Sept. 10, 1901.
H. D. COTTER & J. W. A. GARDAM.
DIPPING NEEDLE COMPASS.
(Application filed Dec. 29, 1897.)

(No Model.)

Witnesses
Inventors
Henry D. Cotter
Joseph W. A. Gardam
By Emley & Rubino
Attorneys

UNITED STATES PATENT OFFICE.

HENRY D. COTTER AND JOSEPH W. A. GARDAM, OF BROOKLYN, NEW YORK, ASSIGNORS TO WILLIAM GARDAM AND JOSEPH GARDAM, OF NEW YORK, N. Y., (COMPOSING FIRM OF WILLIAM GARDAM & SON.)

DIPPING-NEEDLE COMPASS.

SPECIFICATION forming part of Letters Patent No. 682,585, dated September 10, 1901.

Application filed December 29, 1897. Serial No. 664,202. (No model.)

*To all whom it may concern:*

Be it known that we, HENRY D. COTTER, a subject of Her Majesty the Queen of Great Britain, and JOSEPH W. A. GARDAM, a citizen of the United States, both residing at Brooklyn, in the county of Kings and State of New York, have invented certain new and useful Improvements in Dipping-Needle Compasses, of which the following is a specification.

The present improvements relate to dipping-needle compasses wherein a scale is used to measure the declination or dip of the magnetic needle.

The essential object of the invention is to so construct a dipping-needle compass that the magnetic needle therein shall always be free to assume the direction of the magnetic meridian and shall in doing so move an annular dial from the graduated faces of which the amount of dip of the magnetic needle resulting from local or magnetic attractions may be readily observed and calculated.

A further object of the invention is to produce an improved structural form of case and device for suspending same.

Instruments of this character are employed to a considerable extent in mining operations and are frequently lowered into cuts, fissures, pockets, and other indentations for the purpose of locating the direction of ores and of determining their magnetic power. It is for this reason, among others, that it is necessary to suspend the compass in a manner to allow it practically universal movement and without endangering the mounting of the scale with its casing. It is therefore necessary that the scale be supported between oppositely-disposed pivots to preclude the possibility of unshipping it in the event of violent tilting or actual reversal, and it is further necessary to provide a spherical casing in order that the movement of the scale when seeking the meridian may not be obstructed, as it is obvious that the local magnetic attraction may not only dip the needle, but in some cases may be so powerful that the scale will be caused to effect nearly a complete rotation.

The features of invention will be indicated in the claims to follow the description of the herein-shown form of apparatus embodying our invention.

Reference is to be had to the accompanying drawings, forming a part of this specification, in which similar characters of reference indicate corresponding parts in both figures.

Figure 1:
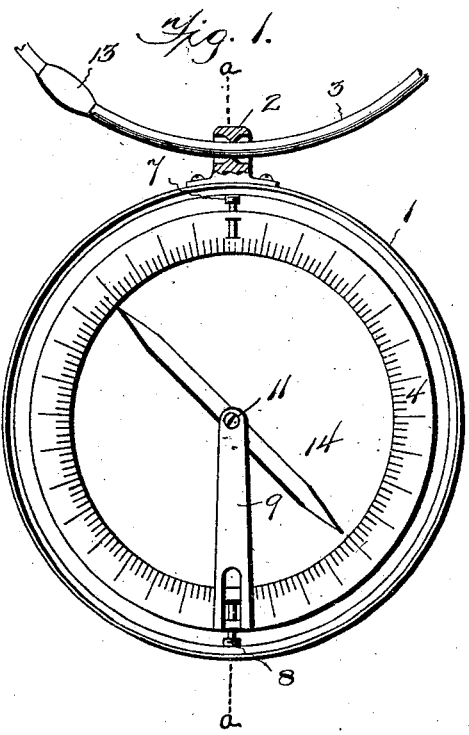
Figure 2:
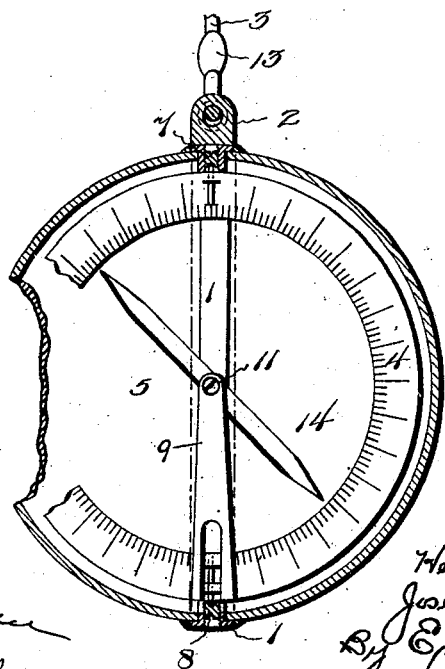

Figure 1 is an elevation view of the dipping needle with a spherical case the front glass of which is removed, the coupling on the top of the case being sectioned away. Fig. 2 is an elevation view of the dial and magnetic needle of the dipping-needle compass the same as in Fig. 1, and a cross-section view of the spherical case on the plane *a a* of Fig. 1.

Referring to the views in detail, 1 represents a narrow ring, preferably of metal, to which are suitably attached, preferably by cement, semispherical glass sides 5 and 6, within which the dial 4 and magnetic needle 14 are incased. The ring 1 is provided with adjustable, preferably agate or jeweled, centers 7 and 8, between which centers the annular dial 4 is pivotally supported. The dial 4 has two arms 9, only one of which is seen in the drawings, which arms are provided with adjustable, preferably agate or jeweled, centers 11, and between said centers the magnetic needle 14 is pivotally supported. The faces of the dial 4 are suitably graduated for the purpose of calculating the angular motion of the magnetic needle 14 around its pivotal support.

A suspension-ring 3, the ends of which are held together by some suitable means, as the coupling 13, is secured to the case by a universal coupling, such as 2. This coupling consists of a piece of metal or other suitable material secured to the ring 1 and through which a circular hole is made, the sides surrounding which are beveled to converge toward the center, thus forming a sharp edge in the center of the coupling, where they meet. The sharp edge bearing upon the suspension-ring 3 permits the instrument to adjust itself to any position of the suspension-ring, so that the instrument by reason of its gravity will always hang plumb.

The operation of the apparatus will now be clear. The instrument is held by the suspension-ring 3, and by reason of the universal-joint connection hangs plumb, with the bearings 7 and 8, in a vertical line perpendicular to the horizon.

When a compass with a spherical case is used, such as that shown, the instrument may be held in any position relative to the magnetic meridian and the magnetic needle will find its meridian, moving with it the dial within which it is carried. The essential feature of novelty in the spherical case is that of its special adaptation to dipping-needle compasses, wherein the magnetic needle is pivotally supported on a horizontal axis within a frame pivotally supported on a vertical axis.

What we claim as new is—

1. In a dipping-needle compass, the combination with a spherical case, and a self-adjusting universal suspension device therefor, of an annular dial pivotally supported within said case above and below in a vertical plane, and a magnetic needle pivotally supported within and operating the dial, and mounted on a horizontal axis provided with adjustable bearings, as and for the purpose set forth.

2. The combination with a ring-support, of a compass provided with a suspending device formed with an opening for the passage of the ring-support, said opening being beveled on opposite sides to form converging walls and a sharp bearing-surface for the ring.

3. The combination with a ring-support and a compass provided with a suspension device, and a universal coupling self-adjusting and having opening through which the suspension device passes, the sides surrounding said opening being beveled to converge toward the center forming a sharp edge at the center of the coupling upon which the suspension device bears, substantially as shown and described.

HENRY D. COTTER.
JOSEPH W. A. GARDAM.

Witnesses:
H. R. SCHWEINLER,
J. J. THENNER.